US010216603B2

(12) United States Patent
Critchley et al.

(10) Patent No.: US 10,216,603 B2
(45) Date of Patent: Feb. 26, 2019

(54) CABLE REMOVAL SYSTEM

(71) Applicant: International Business Machines Corporation, Armonk, NY (US)

(72) Inventors: Daniel S. Critchley, Winchester (GB); Gordon D. Hutchison, Eastleigh (GB); Gareth P. Jones, Chandlers Ford (GB); Jonathan W. L. Short, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 156 days.

(21) Appl. No.: 15/144,146

(22) Filed: May 2, 2016

(65) Prior Publication Data

US 2017/0315895 A1    Nov. 2, 2017

(51) Int. Cl.
*G06F 11/30*      (2006.01)
*H04L 12/707*     (2013.01)

(52) U.S. Cl.
CPC ...... *G06F 11/3051* (2013.01); *G06F 11/3089* (2013.01); *H04L 45/22* (2013.01)

(58) Field of Classification Search
CPC .. G06F 11/3051; G06F 11/3089; G06F 3/044; H04L 45/22
See application file for complete search history.

(56) References Cited

U.S. PATENT DOCUMENTS

| | | | |
|---|---|---|---|
| 6,392,990 B1* | 5/2002 | Tosey | H04L 29/12018 370/218 |
| 7,561,060 B2 | 7/2009 | Duffy, III et al. | |
| 9,111,466 B2 | 8/2015 | Dor et al. | |
| 9,136,682 B2 | 9/2015 | Cudak et al. | |
| 9,160,119 B2 | 10/2015 | Hardy | |
| 2006/0248165 A1* | 11/2006 | Sridhar | H04L 41/5003 709/218 |

(Continued)

OTHER PUBLICATIONS

Downie et al., "RFID tag Readability for Tracking Fiber Optic Connections in Data Centers," 2011 IEEE International Conference on RFID-Technologies and Applications, pp. 230-235, DOI 10.1109/RFID-TA.2011.6068643, 2011.

(Continued)

*Primary Examiner* — Scott B Christensen
*Assistant Examiner* — Lam T Do
(74) *Attorney, Agent, or Firm* — Erik K. Johnson

(57) ABSTRACT

An embodiment of the invention may include a method, computer program product and computer system for a cable removal system. The embodiment may include a computing device that determines whether a user is contacting a network cable. The network cable is physical connection between a first device and a second device. The first device includes at least one network port. The embodiment may include a computing device determining whether an information transmission across the network cable can be rerouted based on determining that the user is contacting the network cable. The embodiment may include a computing device rerouting information transmission based on determining that the information transmission across the network cable can be rerouted. The embodiment may include a computing device alerting the user that there is no information transmission across the network cable based on rerouting the information transmission.

20 Claims, 5 Drawing Sheets

(56) References Cited

U.S. PATENT DOCUMENTS

| | | | |
|---|---|---|---|
| 2007/0237170 A1* | 10/2007 | Proctor | H04R 1/1033 370/462 |
| 2007/0245778 A1* | 10/2007 | Lu | E05B 73/0082 70/58 |
| 2010/0040053 A1* | 2/2010 | Gottumukkula | H04L 41/0816 370/357 |
| 2010/0150573 A1* | 6/2010 | Furuyama | G02B 6/3895 398/142 |
| 2012/0192006 A1* | 7/2012 | Qi | G06F 11/0757 714/6.22 |
| 2013/0021597 A1 | 1/2013 | Carlson, Jr. et al. | |
| 2014/0341079 A1* | 11/2014 | Lin | H04L 41/12 370/255 |
| 2015/0318917 A1 | 11/2015 | Aguren | |
| 2016/0054829 A1* | 2/2016 | Ellis | G06F 3/044 345/178 |
| 2016/0091685 A1* | 3/2016 | Raza | G02B 6/4452 398/19 |
| 2017/0191853 A1* | 7/2017 | Hernes | G01D 5/24 |

OTHER PUBLICATIONS

Unknown, "How do touch-sensitive lamps work?" http://science.howstuffworks.com/innovation/science-questions/touch-sensitive-lamp.html, 3 pgs., last printed Mar. 8, 2016 4:16 PM.

\* cited by examiner

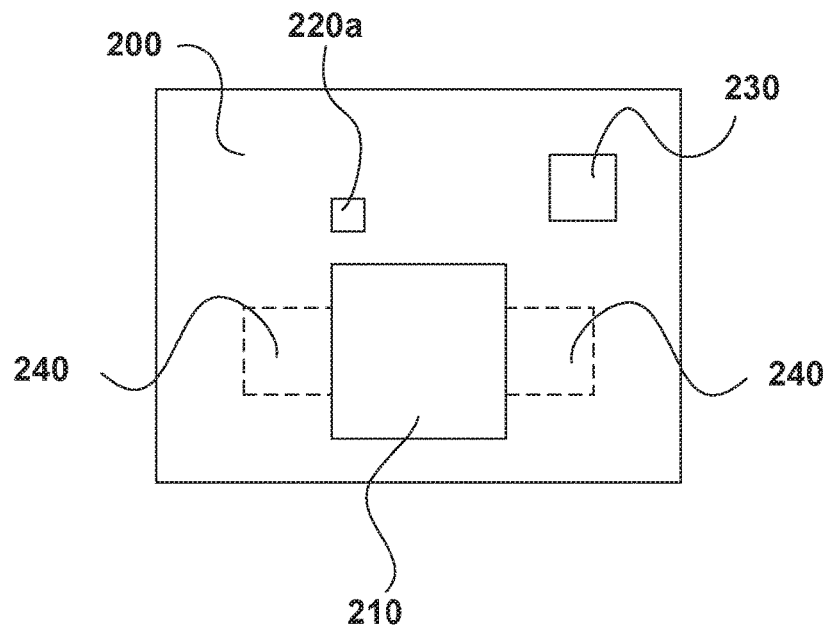
FIG. 2a
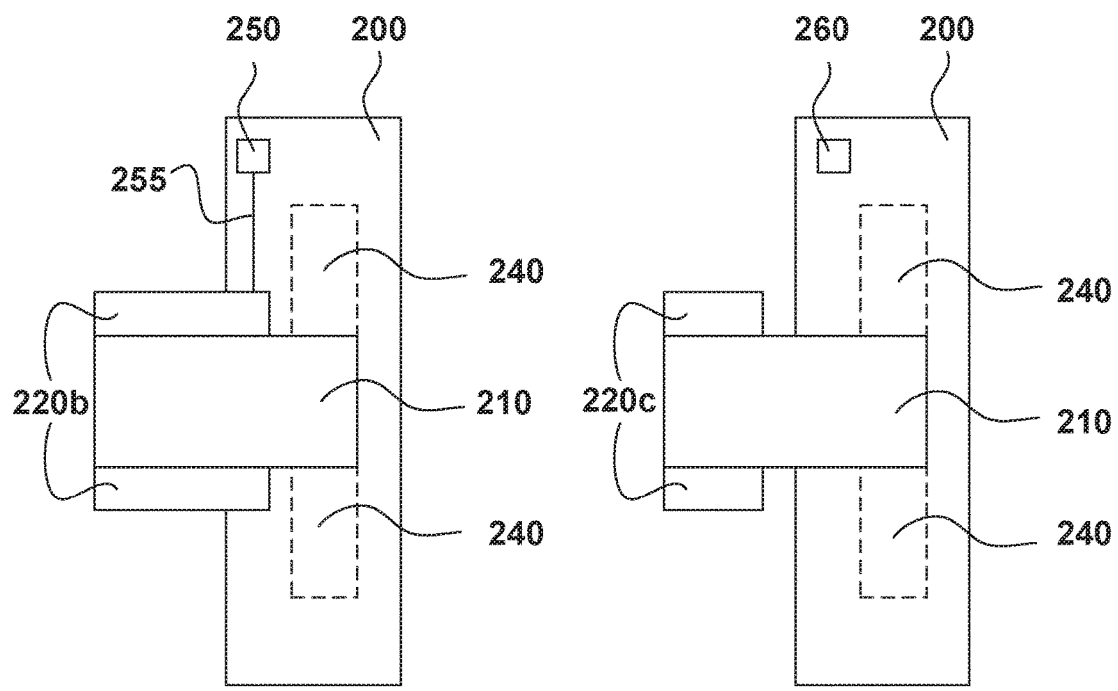
FIG. 2b
FIG. 2c

CABLE REMOVAL SYSTEM

BACKGROUND

The present invention relates to a cable removal system, and more specifically, to a system for rerouting, or quiescing, data transfer across a network cable to be removed.

Networking cables are networking hardware used to connect one network device to other network devices or to connect two or more computers to share printer, scanner etc. Different types of network cables like Coaxial cable, Optical fiber cable, Twisted Pair cables are used depending on the network's topology, protocol and size. The devices can be separated by a few meters (e.g. via Ethernet) or nearly unlimited distances (e.g. via the interconnections of the Internet.

In large networking services, multiple networking cables are routed into, and out of, network servers to form the backbone of a data distribution infrastructure. The networking cables are typically ported into the server at a concentrated point. Maintenance of the infrastructure may require disconnecting the networking cables while the servers are in use.

BRIEF SUMMARY

An embodiment of the invention may include a method, computer program product and computer system for a cable removal system. The embodiment may include a computing device that determines whether a user is contacting a network cable. The network cable is physical connection between a first device and a second device. The first device includes at least one network port. The embodiment may include a computing device determining whether an information transmission across the network cable can be rerouted based on determining that the user is contacting the network cable. The embodiment may include a computing device rerouting information transmission based on determining that the information transmission across the network cable can be rerouted. The embodiment may include a computing device alerting the user that there is no information transmission across the network cable based on rerouting the information transmission.

BRIEF DESCRIPTION OF THE DRAWINGS

FIGS. 2a, 2b and 2c are example embodiments of a network cable and port, in accordance with an embodiment of the invention;

DETAILED DESCRIPTION

Embodiments of the present invention will now be described in detail with reference to the accompanying Figures.

Figure 1:
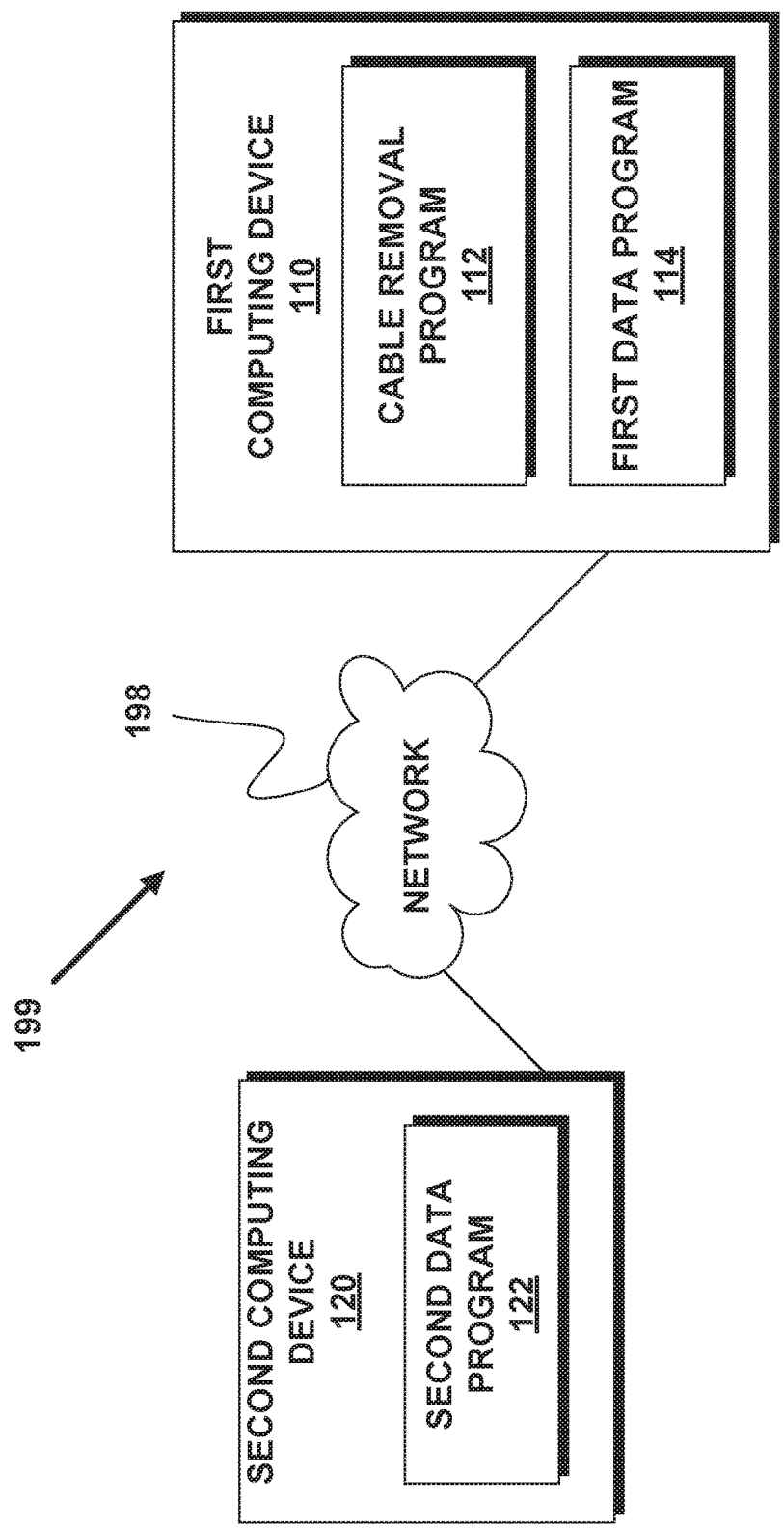
FIG. 1 illustrates a cable removal system, in accordance with an embodiment of the invention.

FIG. 1 illustrates data transmission system 199, in accordance with an embodiment of the invention. In an example embodiment, data transmission system 199 includes a first computing device 110 and a second computing device 120 interconnected via a network 198.

In the example embodiment, network 198 is the Internet, representing a worldwide collection of networks and gateways to support communications between devices connected to the Internet. Network 198 may include, for example, wired, wireless or fiber optic connections. In other embodiments, network 198 may be implemented as an intranet, a local area network (LAN), or a wide area network (WAN). In general, network 198 can be any combination of connections and protocols that will support communications between the first computing device 110 and the second computing device 120.

Second computing device 120 may include a second data program 122. Second computing device 120 may be a desktop computer, a notebook, a laptop computer, a tablet computer, a handheld device, a smart-phone, a thin client, or any other electronic device or computing system capable of receiving and sending data to and from other computing devices such as first computing device 110 via network 198. Although not shown, optionally, second computing device 120 can comprise a cluster of web servers executing the same software to collectively process the requests for the web pages as distributed by a front end server and a load balancer. Second computing device 120 is described in more detail with reference to FIGS. 3a and 3b.

Second data program 122 is a computer program configured to receive, and coordinate, a data transmission to, and from, second computing device 120 via network 198. Second data program 122 may be any program or system capable of sending, or receiving, a digital transmission to, or from, a separate device. Additionally, second data program 122 may utilize modules to encrypt or decrypt information, convert digital data into a digital signal, or perform any other mechanism necessary to transmit digital information across a wired connection.

First computing device 110 includes cable removal program 112 and first data program 114. In the example embodiment, first computing device 110 is a desktop computer, a notebook or a laptop computer; however, in other embodiments, first computing device 110 may be a smart phone, a tablet computer, a handheld device, a thin client, or any other electronic device or computing system capable of receiving and sending data to and from second computing device 120, using at least one wired connection beginning at first computing device 110, through network 198. In an example embodiment, first computing device 110 may contain one or more wired connections to network 198, as depicted in FIGS. 2a-2c. In additional embodiments, first computing device 110 may contain wireless network connections to network 198. First computing device 110 is described in more detail with reference to FIGS. 3a and 3b.

First data program 114 is a computer program configured to receive, and coordinate, a data transmission to, and from, second computing device 120 via network 198. First data program 114 may be any program or system capable of sending, or receiving, a digital transmission from a separate device. Additionally, first data program 114 may utilize modules to encrypt or decrypt information, convert digital data into a digital signal, or perform any other mechanism necessary to transmit digital information across a wired connection.

Cable removal program 112 is a software application or configuration in a software application capable of detecting a user is attempting to remove a wired network connection from first computing device 110, and second computing device 120. In an embodiment, cable removal program 112 detects a user is about to pull the hard network connection, and reroutes data transmission across the wired network connection to be pulled through another data transmission route, so that there is not an interruption in data transfer from the first computing device 110 to the second computing device 120. In another embodiment, cable removal program 112 quiesces, or halts, traffic across the hard network connection so that a transmission is stopped in a manner that no errors would occur from disconnecting the hard network connection, and that data transmission may resume once a connection is reestablished. Detection that a user is about to pull the hard network connection may be done by determining the user is grasping, or touching, the cable connected to the first computing system, or alternatively when a user is touching a portion of the cable port in close proximity (e.g. within 3 inches) to the physical connection between network 198 and first computing device 110. The above is described in more detail with reference to the method of FIGS. 3a and 3b and the hardware described in FIGS. 2a-2c.

FIGS. 2a, 2b and 2c depict various embodiments of a network port connection. FIG. 2a depicts a front view of a port for a network connection, according to an embodiment of the invention. FIG. 2b depicts a cross-sectional view of a port for a network connection, according to another embodiment of the invention. FIG. 2c depicts a cross-sectional view of a port for a network connection, according to another embodiment of the invention. Port casing 200, network cable 210, indicator device 230 and optional interlocking structure 240 are generally described for their use for all three embodiments. Functional elements of each individual embodiment are described in conjunction with the specific embodiment, including: touch detector 220a (FIG. 2a); touch detector 220b, electrical connection 255 and touch sensor relay 250 (FIG. 2b); and touch detector 220c and touch sensor relay 260 (FIG. 2c).

Port casing 200, a part of first computing device 110, is a housing set to receive a network cable 210. Port casing 200 is configured such that first data program 114 may transmit, or receive, information through the network cable 210 when it is attached to port casing 200. Additionally, port casing 200 may contain wiring or electronics to aid in communication from cable removal program 112 with the other various physical components located on port casing 200.

Network cable 210 is a physical connection to transmit information to, or from, first computing device 110 to a separate computing device, via network 198, or network node on network 198. Network cable 210 may be a coaxial cable, fiber optic cable, twisted pair cable, Ethernet cable or any other type of cable for sending and receiving information across a network.

Port Casing 200 may additionally contain an indicator device 230. Indicator device 230 may aid in communicating information to a user from cable removal program 112. Indicator device 230 may be an audio, visual or tactile device that may communicate information to a user. In one embodiment, the indicator device 230 is an electronic light source, such as an LED, and may be capable of displaying a single color or multiple colors. In another embodiment, the indicator device 230 is an audio device, such as a speaker or programmable sound generator. In an additional embodiment, the indicator device may be a tactile indication, such as a vibration.

In an optional embodiment, network cable 210, or port casing 200, may include an interlocking structure 240 to maintain a physical connection between network cable 210 and port casing 200. In one embodiment, interlocking structure 240 may be a physical structure that extends from network cable 210, port casing 200, or both, so that network cable 210 is physically locked into port casing 200. In another embodiment, interlocking structure 240 may include non-physical mechanisms, such as an electromagnetic force, to create the force necessary to maintain a connection between network cable 210 and port casing 200.

Touch detector 220a (FIG. 2a), Touch detector 220b (FIG. 2b) and Touch detector 220c (FIG. 2c) represent separate embodiments of a physical device that senses contact with a user, or with an apparatus associated with the user. In a first embodiment, depicted in FIG. 2a, touch detector 220a is a sensor located on port casing 200. Touch detector 220a may determine physical contact from the user through human capacitance, physically depressing the sensor to complete an electrical circuit (e.g. resistive film, buttons), or any other method or structure that could determine the user was in contact with the sensor.

In a second embodiment, depicted in FIG. 2b, touch detector 220b is located on the periphery, or circumferentially, to the network cable 210. When network cable 210 is connected to port casing 200, touch detector 220b is situated within port casing 200, and comes in physical contact with electrical connection 255. Electrical contact 255 forms a direct connection between touch detector 220b and touch sensor relay 250. Touch sensor relay 250 is a sensor that detects a signal, such as the differences in electrical properties, due to the physical touching of the touch detector 220b. Touch detector 220b is a material, or apparatus, that changes the electric state of current passing between touch sensor relay 250 and touch detector 220b when a user comes in contact with the touch detector 220b. Touch detector 220b may use capacitive sensing, resistive sensing or magnetic sensing. In systems using magnetic sensing, the user may be required to wear a magnetic source (e.g. gloves having magnets) to obtain an effect.

In a third embodiment, depicted in FIG. 2c, touch detector 220c is located on the periphery, or circumferentially, to the network cable 210. Touch sensor relay 260 is a sensor that receives a signal from touch detector 220c. Touch detector 220c is an apparatus that sends a wireless signal to touch sensor relay 260 when touch detector 220c is touched. Touch detector 220c may use capacitive sensing, piezoelectric material or magnetic material, along with an RFID to transmit the signal to touch sensor relay 260. In systems using magnetic sensing, the user may be required to wear a magnetic source (e.g. gloves having magnets) to obtain an effect.

Figure 3A:
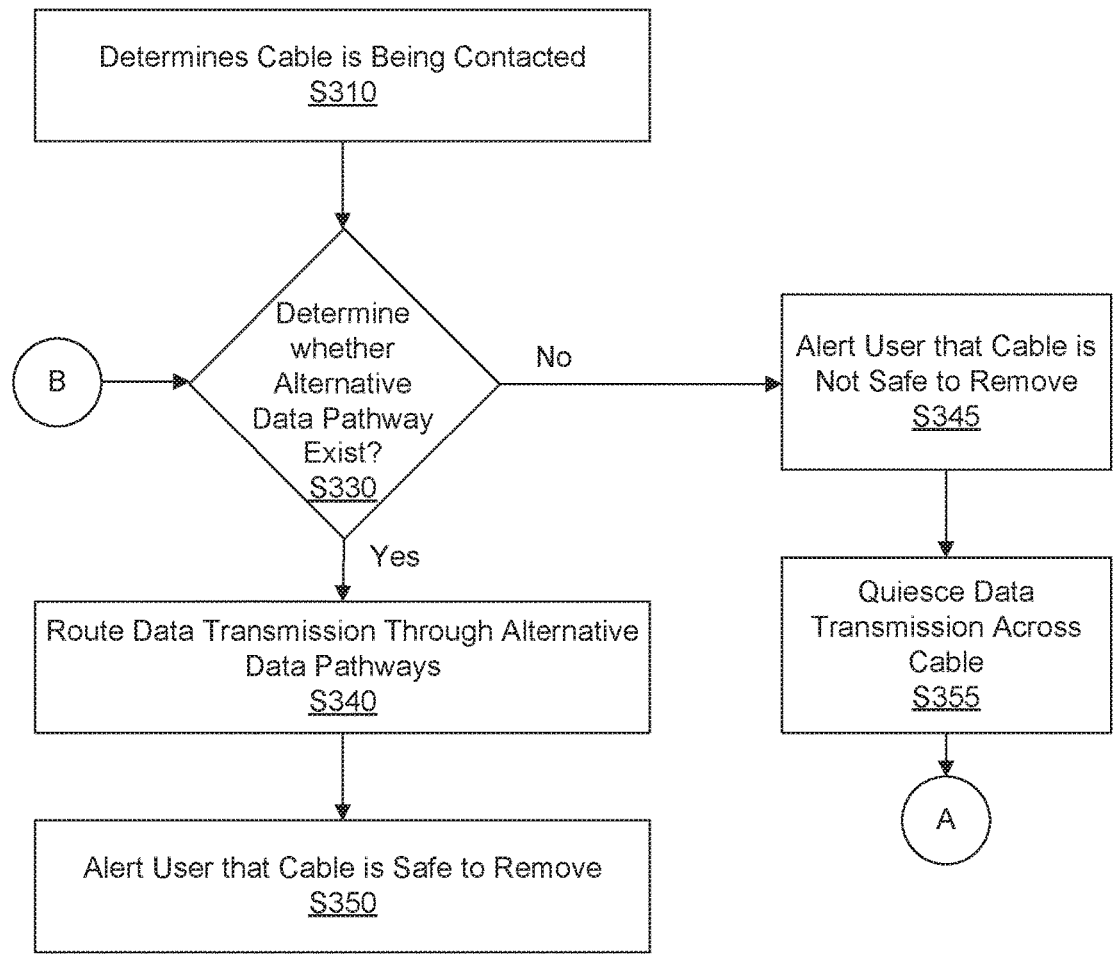
FIGS. 3a and 3b is a flowchart illustrating the operations of the cable removal program of FIG. 1, in accordance with an embodiment of the invention.
Figure 3B:
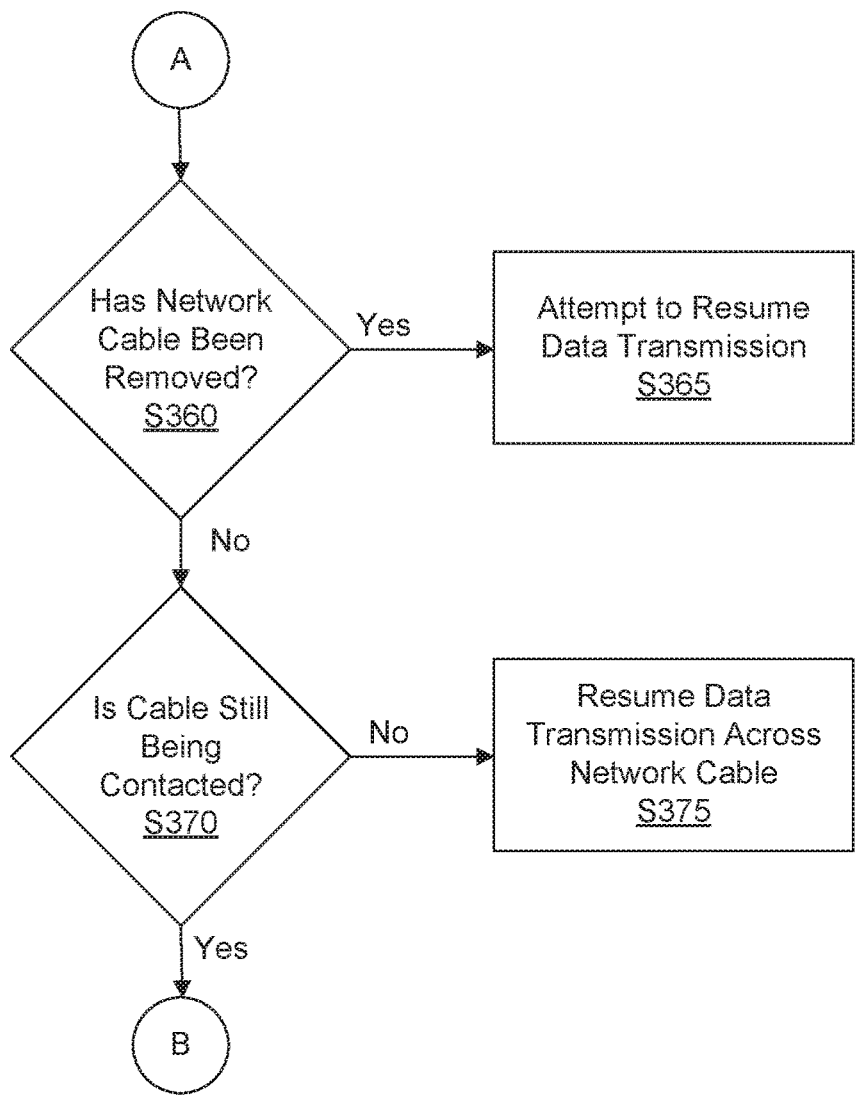

FIGS. 3a and 3b depict a flow chart illustrating the steps of cable removal program 112, according to an example embodiment. Referring to step S310, cable removal program 112 determines that the network cable 210 is being contacted by a user. Cable removal program 112 determines the network cable is being contacted by analyzing the signal received from touch detector 220a, 220b or 220c. In one embodiment, such as when the touch detector is a button or sends out an RFID signal that it has been depressed, cable removal program 112 may receive a discrete signal from touch detector 220a, 220b or 220c that details network cable 210 is being contacted (and about to be removed). In another embodiment, such as when touch detector uses capacitive sensing, cable removal program 112 may receive multiple analog inputs from network cables in close proximity to one another. The cable removal program 112 may determine which network cable is in contact with a user by comparing the current change in capacitance to a model detailing the typical change in capacitance for the network cable 210 when touch detector 220a, 220b or 220c is contacted. The model may be based on a physical model of the system, or a historical model based on previous interactions.

Referring to step S330, cable removal program 112 determines whether an alternative data pathway exists. In one embodiment, the cable removal program 112 attempts to ping the second computing device 120 without using the network cable that is to be pulled. A ping is a computer network administration software utility used to test the reachability of a host on an Internet Protocol (IP) network and to measure the round-trip time for messages sent from the originating host to a destination computer and back. Additionally, the ping may include MAC addresses, physical address, or any other type of device signifiers, of any device used en route from the first device 110 to the second device 120 (without using the network cable) may be recorded. In such instances, the attempt to ping the second computing device 120 may be done either through hardwired network connections, or through wireless connections (e.g. wi-fi, Bluetooth, 3G, 4G). The determination that the alternative pathway exists may include receiving a response from a ping sent out during step S330.

In another embodiment, cable removal program 112 may perform an analysis of a network connections map, which details the connections between systems on a network, to determine if there is any alternative pathway from the first computing device 110 to the second computing device 120. Determining that the alternative pathway exists may include finding an alternative node-to-node path on the network connections map bypassing the network cable 210 that is being contacted. In an additional embodiment, cable removal program 112 may communicate that it is searching for an alternative path using indicator device 230. In one embodiment, indicator device 230 may provide a visual signal that cable removal program 112 is searching for an alternative path by, for example, a blinking LED light, or a specific color of LED light. In another embodiment, indicator device 230 may provide an audio signal such as, for example, a beep. If the alternative data pathway exists, cable removal program 112 proceeds to step S340. If the alternative data pathway does not exist, cable removal program 112 proceeds to step S345.

Referring to step S340, cable removal program 112 routes the information being transmitted across the network cable 210 through the alternative pathways determined in step S320. In one embodiment, the information may be routed through the alternative node-to-node path determined in step S320. Additionally, cable removal program 112 may break down the data transmission into segments, where each segment of the data transmission is capable of being transmitted independently from the other segments without causing errors to the overall data transmission. Following completion of a current segment of the data transmission, the subsequent segments of data transmission may be rerouted through the new data transmission path determined in step S330. Segmentation of the data transmission may reduce the amount of errors caused by rerouting data transmission by performing the rerouting only in places where uninterrupted data transmission is unnecessary.

Referring to step S350, cable removal program 112 alerts the user that the information being transmitted across the network cable 210 has been successfully rerouted. Cable removal program 112 may communicate that information is being rerouted using indicator device 230. In one embodiment, indicator device 230 may provide a visual signal that cable removal program 112 is rerouting the data transmission by, for example, a solid LED light, or a specific color of LED light. In another embodiment, indicator device 230 may provide an audio signal such as, for example, a constant tone. In either embodiment, the visual or audio signal used should be different than the signal from step S320. Additionally, in embodiments where interlocking structure 240 is used, a signal is sent to the interlocking structure 240 to allow the structure to disengage, and allow for the network cable to be pulled.

Referring to step S345, cable removal program 112 alerts the user that there is no alternative pathway to route the information being transmitted across the network cable 210. In one embodiment, indicator device 230 may provide a visual signal that cable removal program 112 is rerouting the data transmission by, for example, a blinking LED light, or a specific color of LED light. In another embodiment, indicator device 230 may provide an audio signal such as, for example, an intermittent tone. In either embodiment, the visual or audio signal used should be different than the signal from step S350.

Referring to step S355, cable removal program 112 quiesces information transmission across the network cable 210. Quiescing information may include stopping information transmission at a place in where it could be resumed without error at a later time. For example, cable removal program 112 may break down the data transmission into segments, where each segment of the data transmission is capable of being transmitted independently from the other segments without causing errors to the overall data transmission. Following completion of a current segment of the data transmission, the subsequent segments of data transmission may be halted, and the segments that still need to be transmitted to second computing device 120 may be stored, so that transmission of the stored segments may be continued at a later time.

Referring to step S360, cable removal program 112 determines whether the network cable has been removed. This may be determined when a physical connection between the network cable 210 and the port casing 200 are no longer in contact with each other. In on embodiment, this may be determined by attempting to send a ping from first computing device 110 to second computing device 120, and comparing the response time of the ping to a response time of a typical ping across network cable 210. In another embodiment, this may be determined by receiving electrical transmissions from network cable 210. If cable removal program 112 determines the network cable 210 has been removed, cable removal program 112 proceeds to step S365. If cable removal program 112 determines that the network cable 210 has not been removed, cable removal program 112 proceeds to step S370.

Referring to step S365, cable removal program 112 may intermittently attempt to resume data transmission. This may occur in instances where the network cable 210 has been reattached, and data transmission may resume. In other instances, cable removal program 112 may intermittently search for alternative data pathways by either attempting to ping the second computing device 120, or searching updated network maps for possible paths to transmit data to the second computing device 120.

Referring to step S370, cable removal program 112 determines whether the network cable 210 is still being contacted by the user. Cable removal program 112 determines the network cable is being contacted by analyzing the signal received from touch detector 220a, 220b or 220c. In one embodiment, such as when the touch detector is a button or sends out an RFID signal that it has been depressed, cable removal program 112 may receive a discrete signal from touch detector 220a, 220b or 220c that details network cable 210 is being contacted (and about to be removed). In another embodiment, such as when touch detector uses capacitive sensing, cable removal program 112 may receive multiple analog inputs from network cables in close proximity to one another. The cable removal program 112 may determine which network cable is in contact with a user by comparing the current change in capacitance for a model change in capacitance for the specific network cable. The model may be based on a physical model of the system, or a historical model based on previous interactions. If cable removal program 112 determines contact between the user and the cable has ceased, cable removal program 112 proceeds to step S375. If cable removal program 112 determines contact between the user and the cable is ongoing, cable removal program 112 proceeds to step S320.

Referring to step S375, cable removal program 112 resumes data transmission. In such instances, data transmission is resumed through network cable 210, and is resumed from the point at which it was previously quiesced.

Figure 4:
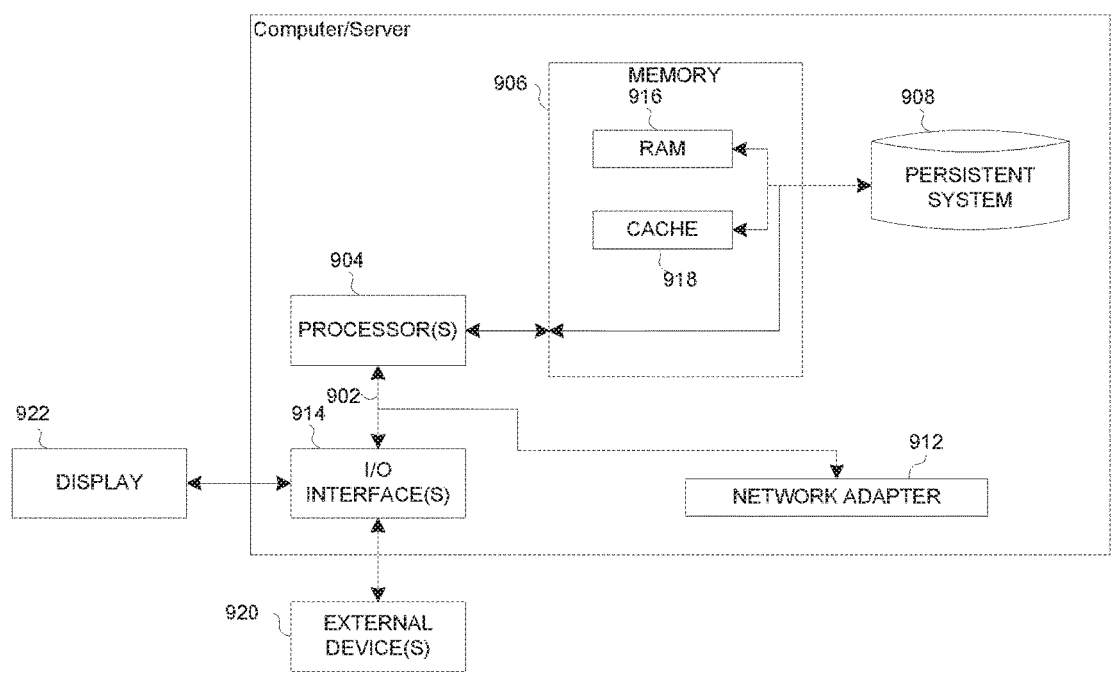
FIG. 4 is a block diagram depicting the hardware components of the cable removal system of FIG. 1, in accordance with an embodiment of the invention.

FIG. 4 depicts a block diagram of components of first computing device 110 and second computing device 120, in accordance with an illustrative embodiment of the present invention. It should be appreciated that FIGS. 3a and 3b provide only an illustration of one implementation and does not imply any limitations with regard to the environments in which different embodiments may be implemented. Many modifications to the depicted environment may be made.

First computing device 110 and second computing device 120 include communications fabric 902, which provides communications between computer processor(s) 904, memory 906, persistent storage 908, communications unit 912, and input/output (I/O) interface(s) 914. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 916 and cache memory 918. In general, memory 906 can include any suitable volatile or non-volatile computer-readable storage media.

The programs cable removal program 112, first data program 114 in first computing device 110; and second data program 122 in second computing device 120 are stored in persistent storage 908 for execution by one or more of the respective computer processors 904 via one or more memories of memory 906. In this embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer-readable storage medium that is also part of persistent storage 908.

Communications unit 912, in these examples, provides for communications with other data processing systems or devices. In these examples, communications unit 912 includes one or more network interface cards. Communications unit 912 may provide communications through the use of either or both physical and wireless communications links. The programs cable removal program 112, first data program 114 in first computing device 110; and second data program 122 in second computing device 120 may be downloaded to persistent storage 908 through communications unit 912.

I/O interface(s) 914 allows for input and output of data with other devices that may be connected to first computing device 110 and social media second computing device 120. For example, I/O interface 914 may provide a connection to external devices 920 such as a keyboard, keypad, a touch screen, and/or some other suitable input device. External devices 920 can also include portable computer-readable storage media such as, for example, thumb drives, portable optical or magnetic disks, and memory cards. Software and data used to practice embodiments of the present invention, e.g., The programs cable removal program 112, first data program 114 in first computing device 110; and second data program 122 in second computing device 120, can be stored on such portable computer-readable storage media and can be loaded onto persistent storage 908 via I/O interface(s) 914. I/O interface(s) 914 can also connect to a display 922.

Display 922 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

What is claimed is:

1. A method for a cable removal system, the method comprising:
   detecting, by a computer processor, a physical contact of the user with a touch sensor adjacent to a network port of a first device, wherein the network cable is a physical connection between the first device and a second device;

responsive to detecting the physical contact:
   determining, by the computer processor, that the user is attempting to remove the network cable;
   determining, by the computer processor, whether an information transmission across the network cable can be rerouted over an alternate pathway;
   responsive to determining that the information transmission can be rerouted:
      rerouting the information transmission over the alternate pathway;
      alerting the user that there is no information transmission across the network cable; and
      enabling the user to safely disconnect the network cable.

2. The method of claim 1, wherein the touch sensor comprises a capacitive sensor, and wherein determining that a user is removing the network cable comprises detecting the user is touching the capacitive sensor.

3. The method of claim 2, wherein detecting the user is touching the capacitive sensor comprises detecting a change in capacitance across the capacitive sensor based on comparing the change in capacitance across the sensor to a historical change in capacitance across the sensor when the sensor is being contacted.

4. The method of claim 1, wherein alerting the user that there is no information transmission across the network cable comprises one or more of: an audio signal, a visual signal and a tactile signal.

5. The method of claim 1, wherein determining whether information transmission across the network cable can be rerouted comprises pinging the second device from the first device using a pathway that does not include the network cable.

6. The method of claim 1, based on determining that information transmission across the network cable cannot be rerouted, quiescing the information transmission.

7. The method of claim 1, further comprising based on rerouting the information transmission disconnecting a physical interlock, wherein the physical interlock fastens the network cable to the first device.

8. A computer program product for a cable removal system, the computer program product comprising:
   one or more computer-readable storage devices and program instructions stored on at least one of the one or more computer-readable storage devices, the program instructions comprising:
      program instructions to detect a physical contact of the user with a touch sensor adjacent to a network port of a first device, wherein the network cable is a physical connection between the first device and a second device;
      responsive to detecting the physical contact:
         program instructions to determine, by the computer program, that the user is attempting to remove the network cable;
         program instructions to determine, by the computer program, whether an information transmission across the network cable can be rerouted over an alternate pathway;
         responsive to determining that the information transmission can be rerouted:
            program instructions to reroute the information transmission over the alternate pathway;
            program instructions to alert the user that there is no information transmission across the network cable; and
            program instructions to enable the user to safely disconnect the network cable.

9. The computer program product of claim 8, wherein the touch sensor comprises a capacitive sensor, and wherein the program instructions to determine that the user is removing the network cable comprises detecting the user is touching the capacitive sensor.

10. The computer program product of claim 9, wherein the program instructions to detect the user is touching the capacitive sensor comprises program instructions to detect a change in capacitance across the capacitive sensor based on comparing the change in capacitance across the sensor to a historical change in capacitance across the sensor when the sensor is being contacted.

11. The computer program product of claim 8, wherein the program instructions to alert the user that there is no information transmission across the network cable comprises one or more of: an audio signal, a visual signal and a tactile signal.

12. The computer program product of claim 8, wherein the program instructions to determine whether information transmission across the network cable can be rerouted comprises pinging the second device from the first device using a pathway that does not include the network cable.

13. The computer program product of claim 8, based on determining that information transmission across the network cable cannot be rerouted, program instructions to quiesce the information transmission.

14. The computer program product of claim 8, further comprising based on rerouting the information transmission the program instructions to disconnect a physical interlock, wherein the physical interlock fastens the network cable to the first device.

15. A computer system for a cable removal system, the computer system comprising:
   one or more processors, one or more computer-readable memories, one or more computer-readable storage devices, and program instructions stored on at least one of the one or more computer-readable storage devices for execution by at least one of the one or more processors via at least one of the one or more computer-readable memories, the program instructions comprising:
      program instructions to detect a physical contact of the user with a touch sensor adjacent to a network port of a first device, wherein the network cable is a physical connection between the first device and a second device;
      responsive to detecting the physical contact:
         program instructions to determine, by the computer program, that the user is attempting to remove the network cable;
         program instructions to determine, by the computer program, whether an information transmission across the network cable can be rerouted over an alternate pathway;
         responsive to determining that the information transmission can be rerouted:
            program instructions to reroute the information transmission over the alternate pathway;
            program instructions to alert the user that there is no information transmission across the network cable; and
            program instructions to enable the user to safely disconnect the network cable.

16. The computer system of claim 15, wherein the touch sensor comprises a capacitive sensor, and wherein the program instructions to determine that the user is removing the network cable comprises detecting the user is touching the capacitive sensor.

17. The computer system of claim 16, wherein the program instructions to detect the user is touching the capacitive sensor comprises program instructions to detect a change in capacitance across the capacitive sensor based on comparing the change in capacitance across the sensor to a historical change in capacitance across the sensor when the sensor is being contacted.

18. The computer system of claim 15, wherein the program instructions to alert the user that there is no information transmission across the network cable comprises one or more of: an audio signal, a visual signal and a tactile signal.

19. The computer system of claim 15, wherein the program instructions to determine whether information transmission across the network cable can be rerouted comprises pinging the second device from the first device using a pathway that does not include the network cable.

20. The computer system of claim 15, further comprising based on rerouting the information transmission the program instructions to disconnect a physical interlock, wherein the physical interlock fastens the network cable to the first device.

* * * * *